Figure 1:
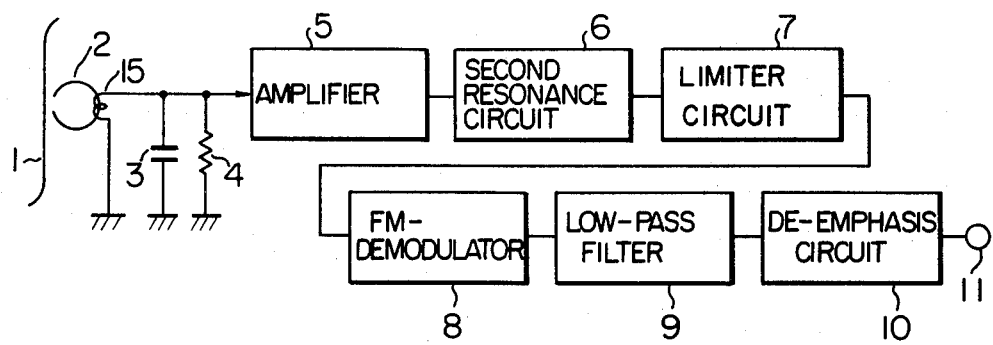

United States Patent [19]
Watatani et al.

[11] 4,403,264
[45] Sep. 6, 1983

[54] PICTURE SIGNAL AMPLIFYING CIRCUIT FOR MAGNETIC VIDEO RECORDING AND REPRODUCING APPARATUS

[75] Inventors: Yoshizumi Watatani; Atsushi Yoshioka, both of Yokohama, Japan

[73] Assignee: Hitachi, Ltd., Tokyo, Japan

[21] Appl. No.: 237,849

[22] Filed: Feb. 24, 1981

[30] Foreign Application Priority Data

Feb. 25, 1980 [JP] Japan .................................. 55-21680

[51] Int. Cl.³ ........................................... H04N 5/785
[52] U.S. Cl. .................. 360/33.1; 358/340; 360/65; 360/67
[58] Field of Search ............ 360/65, 67, 33, 26, 360/30, 33.1; 358/127, 166, 170, 335, 340, 167

[56] References Cited

U.S. PATENT DOCUMENTS 4,210,942 7/1980 Nakamura .............................. 360/65
4,303,952 12/1981 Yamamitsu ............................ 360/65

FOREIGN PATENT DOCUMENTS 2753365 5/1979 Fed. Rep. of Germany ........ 360/65

Primary Examiner—Alan Faber
Attorney, Agent, or Firm—Antonelli, Terry & Wands

[57] ABSTRACT

A magnetic picture signal recording/reproducing apparatus in which a picture signal recorded on a magnetic tape is read out by a magnetic head for reproduction. First and second resonance circuits having respective resonance frequencies in the vicinity of a frequency of a carrier signal corresponding to a white peak level of the picture signal and in the vicinity of a frequency corresponding to an average level of the picture signal, respectively, are connected in cascade, to thereby prevent the white peak level of the picture signal from being attenuated.

2 Claims, 5 Drawing Figures

PICTURE SIGNAL AMPLIFYING CIRCUIT FOR MAGNETIC VIDEO RECORDING AND REPRODUCING APPARATUS

The present invention relates in general to a picture or video signal amplifying circuit for a magnetic video recording/reproducing apparatus. In particular, the invention concerns a reproducing amplifier circuit for amplifying output signals produced from a magnetic head which is adapted to pick up picture or video signals recorded on a magnetic tape.

In the magnetic video recording/reproducing apparatus which is destined for recording a television signal on a magnetic tape and reproducing the television signal recorded on the magnetic tape, a carrier signal is modulated in frequency by the picture signal (brightness) portion of the composite television signal, the resultant frequency-modulated signal being then recorded on the magnetic tape. The frequency-modulation of the carrier signal with the picture signal is carried out in such a manner that the frequency of the carrier signal becomes higher toward the white level of the picture signal, while the frequency of the carrier signal becomes lower toward the black level of the picture signal. It is noted that when the carrier signal is frequency-modulated by the picture signal prior to the recording thereof, numerous noises are contained in a high frequency band of the picture signal, resulting in a degraded signal-to-noise ratio in the high frequency signals. Under circumstances, the signal level of the high frequency components of the picture signal is raised, that is to say, pre-emphasized prior to the above-mentioned frequency-modulation.

It is further observed that when the frequency modulated signal is recorded on or/reproduced from a magnetic tape, the amplitude of the recorded or reproduced signal becomes smaller as the signal frequency is increased, due to frequency characteristics of the magnetic tape and the magnetic head. As a consequence, the amplitude of the signal in the high frequency region is decreased and becomes more susceptible to the interference of noise in the reproducing operation. Because the frequency modulation of the carrier signal with the picture signal is carried out so that the frequency of the carrier signal becomes higher toward the white level of the picture signal as described above, the smaller amplitude of the signal in the high frequency band will result in an insufficiency in the amplitude of the demodulated picture signal in the vicinity of the white level during the reproducing operation, which in turn results in an inadequate luminance in the reproduced picture displayed by the television receiver. For this reason, there arises sometimes a so-called inversion phenomenon in which the white portion of the picture is inverted to appear black due to the excessively small amplitude of the picture signal at the white level.

In an attempt to exclude the inversion phenomenon described above, it is a generally adopted procedure in the recording operation that the peak of the white level of the picture signal which has undergone the preemphasis is clipped so that the carrier frequency may not be increased beyond a predetermined value, and the resultant signal is then utilized for the frequency modulation. Since the white level of the picture signal does not go beyond a predetermined amplitude, the highest frequency of the carrier signal is determined correspondingly, whereby the phenomenon of color inversion described above is prevented in the reproducing operation. However, the magnetic tape and the magnetic head exhibit such transmission characteristics that higher frequency signal components tend to be more attenuated, necessitating frequency compensation in the reproducing operation mode. Further, the signal derived from the magnetic pick-up head per se is at a low level and thus susceptible to adverse influences of noise in the reproducing amplifier, which should preferably be obviated. Such being the circumstances, compensation of the characteristic described above is effected usually by making use of the resonance characteristic of the magnetic head. The resonance characteristic is determined by the inductance $L_h$ of the magnetic head, and the input capacitance $C_1$ and distributed capacitance $C_2$ of the reproducing amplifier. The resonance frequency $f_r$ is given by the following expression:

$$f_r = \frac{1}{2\pi \sqrt{L_h(C_1 + C_2)}} \qquad (1)$$

With a view to improving the signal-to-noise (SN) ratio of the reproduced picture signal, the resonance frequency is usually selected from the frequency range of the frequency-modulated carrier which correspondingly lies between the average picture signal level and the saturated white level.

The resonance characteristic of the magnetic head is made use of for intensifying the signals of frequencies which lie in the vicinity of the resonance frequency $f_r$, to thereby reduce relatively the noise components of frequencies deviated from the resonance frequency $f_r$. As a result, the signal-to-noise ratio of the picture signal reproduced through frequency demodulation is improved.

However, in the reproducing amplifier having the resonance characteristic described above, those noise components which have frequencies in the vicinity of the resonance frequency $f_r$ are likely to be selectively amplified, when the instantaneous carrier frequency is shifted from the resonance frequency $f_r$. Particularly, in the vicinity of the white peak point (or in the vicinity of the white clip point when the white peak is clipped in the recording operation) where the output level of the reproducing amplifier is likely to be lowered, noise components inherent to the operation of the reproducing amplifier will exert greater influence on the reproduced picture signal, resulting in a degrading of the signal-to-noise or SN ratio of the picture signal.

In particular, when the instantaneous carrier frequency is at a value corresponding to the white peak level of the picture signal, the noise components of the frequencies lying in the vicinity of the resonance frequency of the magnetic head undergo intensified amplification. Consequently, the SN ratio of the reproduced picture signal is more intensely degraded, as the instantaneous carrier frequency deviates to a greater extent from the resonance frequency $f_r$. Thus, the pre-emphasis also contributes to making the noises more noticeable in contour portions of a reproduced picture. Further, since the lower side-band components as well as the noises in the lower side-band are relatively increased, the so-called inversion phenomenon is likely to occur. It is additionally noted that the phase of the carrier signal is caused to delay for 90° at the resonance frequency and is delayed for 180° at the frequency corresponding to the white peak due to the resonance characteristic of the magnetic head. As a consequence, the reproducing amplifier exhibits asymmetrical phase characteristics in the intermediate frequency band and the high frequency band, which means that the transmission characteristic of the reproducing amplifier circuit for the frequency modulated signal is deteriorated, involving remarkable distortions in the signal waveform. When the resonance frequency of the magnetic head is shifted to the high frequency region in an attempt to prevent degradation of the SN ratio, occurrence of the inversion phenomenon and the distortions of the signal waveform, the reproduced level of the carrier frequency corresponding to the white peak of the picture signal is certainly increased. On the contrary, the reproduced level of the carrier frequencies corresponding to the flat portion of the picture signal is lowered and involves a remarkable degradation of the SN ratio in combination with the emphasized noise components of frequencies lying in the vicinity of the resonance frequency $f_r$ of the magnetic head.

The phenomena described in the foregoing make appearance predominantly in the small type magnetic video signal recording and reproducing apparatus. In addition, the frequency of the picture or video signal of the television signal is distributed over an extremely wide frequency range from D.C. to a frequency of the order of 4 MHz. It is thus difficult to record the signal of such a wide frequency range at a uniform signal level on the magnetic tape. In particular, difficulty is encountered in recording a signal having as high a frequency as 4 MHz. Under the circumstances, the frequency band is compressed by frequency-modulating the carrier signal with the picture signal, while the magnetic head is rotated to thereby increase the speed of the magnetic tape relative to the magnetic head and hence lengthen the wavelength of the signal to be recorded, with a view to allowing the signals of high frequencies to be recorded on the magnetic tape. In practice, the magnetic tape is caused to run along and around a peripheral surface of a rotating cylinder, and a pair of magnetic heads are usually mounted in the cylinder in such a manner that the respective magnetic gaps of the magnetic heads are exposed at the outer peripheral surface of the cylinder. The magnetic heads are rotated together with the cylinder for recording the picture signal sequentially on the field base on the magnetic tape along the inclined transverse tracks.

In the magnetic video signal recording and reproducing apparatus having the structure described above, the revolution number of the recording head for recording the picture signal corresponding to a single field of the television signal sequentially by one magnetic head on the magnetic tape is determined by the frequency of the vertical synchronizing signal of the television signal. Accordingly, in order to allow the high frequency signal to be recorded by increasing the relative speed between the magnetic heads and the magnetic tape, the diameter of the cylinder has to be enlarged to thereby increase the peripheral speed of the magnetic head cylinder. However, in the case of the small size apparatus, restriction is inevitably imposed on the use of the cylinder of an increased diameter, making it practically impossible to record the high frequency signal components at a sufficient signal level.

There is at present a great demand for miniaturization of the magnetic recording and reproducing apparatus to such a degree that the apparatus can be accommodated integrally within a main body of a television camera so as to be freely portable as a single integral unit. In such case, the diameter of the head cylinder has to be reduced to accomplish the desired miniaturization, which involves a correspondingly reduced speed of the magnetic head or heads, rendering it very difficult, if not impossible, to record the picture signal of white level at a sufficient or adequate signal level. It goes without saying that the reproduction of the signals recorded with such miniature type magnetic recording and reproducing apparatus is accompanied by a great deal of noise and suffers undesirable phenomena such as the color inversion and the like.

Accordingly, it is an object of the invention to provide a picture signal amplifying circuit for a magnetic recording and reproducing apparatus, which circuit is immune to the disadvantages of the hitherto known apparatus and is capable of improving the signal-to-noise or SN ratio at the white peak while minimizing the degradation of the SN ratio at flat portions of the picture signal.

In view of the above object, it is proposed according to a general feature of the invention that a second resonance circuit is provided in addition to the first resonance circuit of the magnetic head, wherein the first resonance circuit has a first resonance frequency in the vicinity of the frequency of the frequency-modulated carrier corresponding to a white peak level of the picture signal, and a second resonance circuit connected in cascade with said first resonance circuit has a second resonance frequency in the vicinity of the frequency of the carrier signal corresponding to an average level of said picture signal, so that the reproducing amplifier exhibits as a whole such a frequency-amplitude characteristic as would be attained if the reproducing amplifier was implemented in a double tuned amplifier. According to the invention, the signal-to-noise or SN ratio at the white peak point is significantly improved with distortion of the signal waveform being noticeably reduced, while the SN ratio at flat portions are prevented from being degraded.

Figure 2:
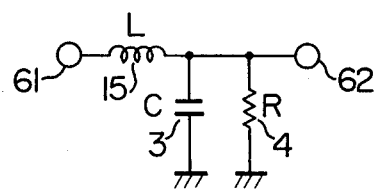
Figure 3:
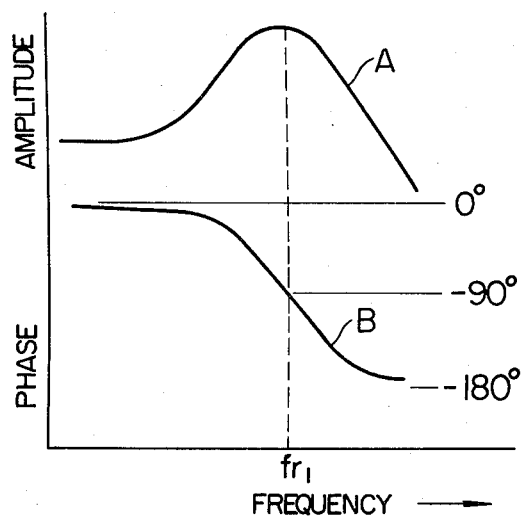
Figure 4:
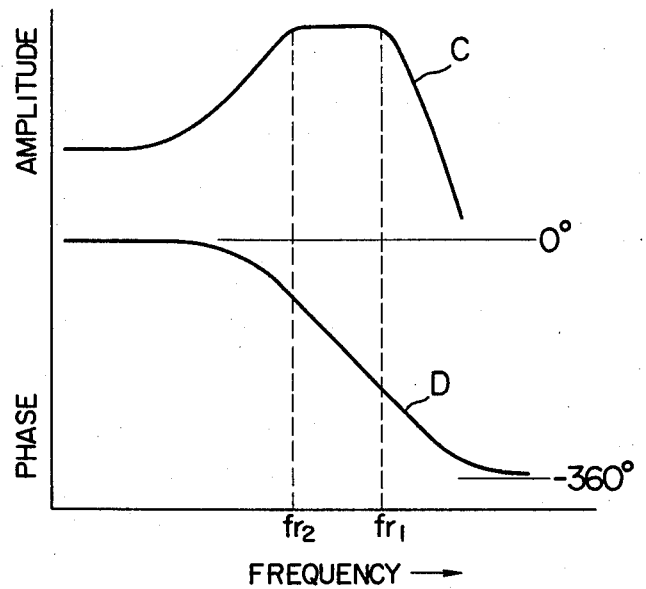
Figure 5:
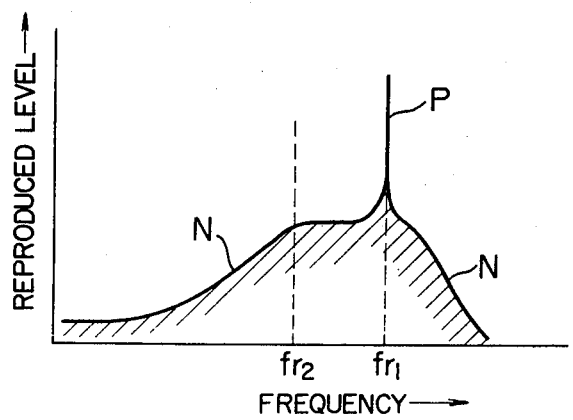

The above and other objects, features and advantages of the present invention will become more apparent from the following description of the preferred embodiments of the invention taken in conjunction with the accompanying drawings, in which:

FIG. 1 shows in a block diagram a general arrangement of the picture signal amplifying circuit for a magnetic video signal recording and reproducing apparatus according to an embodiment of the invention, FIG. 2 is a circuit diagram showing an exemplary circuit configuration of resonance circuits used in the picture signal amplifying circuit according to the invention, FIG. 3 graphically illustrates amplitude and phase characteristics of the resonance circuit shown in FIG. 2, FIG. 4 graphically illustrates amplitude and phase characteristics of the picture signal amplifying circuit according to the invention, and FIG. 5 shows a spectral diagram of a reproduced picture signal on the assumption that a modulated carrier signal has a frequency corresponding to a white peak point.

In the following, the invention will be described in detail in conjunction with an exemplary embodiment of the picture signal amplifying circuit for a magnetic video signal recording/reproducing apparatus according to the invention, with the aid of the accompanying drawings. Referring to FIG. 1 which shows in a block diagram an example of the picture or video signal amplifying circuit according to the invention, reference numeral 1 denotes a magnetic tape on which a picture signal of television signal is recorded. The signal recorded on the magnetic tape is constituted by a modulated signal which is derived by frequency-modulating a carrier signal by the picture signal in a manner in which the frequency of the carrier signal becomes higher toward the white level of the picture signal. Reference numeral 2 denotes a magnetic head which is fixedly mounted on a rotatable cylinder for rotation therewith and serves for reproducing the signal recorded on the magnetic tape 1. The magnetic head 2 comprises a pick-up coil 15 wound around a core made of a magnetic material and designed to pick up the signal recorded on the magnetic tape. The pick-up coil 15 has one end grounded and the other end connected to an input terminal of a reproducing amplifier 5. A capacitor 3 is connected in parallel with a resistor 4 between ground and the other end of the pick-up coil 15. The output terminal of the reproducing amplifier 5 is connected to an input terminal of a second resonance circuit 6. Numeral 7 denotes a limiter circuit which has an input terminal connected to the output terminal of the resonance circuit 6 and has an output terminal connected to the input terminal of an FM demodulator 8 whose output terminal in turn is connected to the input terminal of a low-pass filter 9 having an output terminal connected to the input terminal of a de-emphasis circuit 10. Numeral 11 denotes the output terminal for the reproduced picture signal.

In the circuit arrangement described above, the pick-up coil 15 of the magnetic head 2 constitutes a first resonance circuit in cooperation with the capacitor 3. The resonance sharpness Q of the first resonance circuit is determined by the resistor 4 serving as a damping resistor. The first resonance circuit can be depicted in a circuit diagram shown in FIG. 2, in which reference numerals 61 and 62 represent input and output terminals, respectively. The transfer function G(S) of this resonance circuit may be expressed as follows:

$$G(S) = \frac{\frac{1}{LC}}{S^2 + \frac{1}{CR}S + \frac{1}{LC}} \quad (2)$$

where $S = j\omega$ and $\omega = 2\pi f$.

Referring to FIG. 3, curves A and B represent, respectively, the amplitude characteristic and the phase characteristic of the first resonance circuit mentioned above. In this graph, frequency is taken along the abscissa.

The resonance frequency $f_{r1}$ of the first resonance circuit is determined by the inductance L of the pick-up coil 15 and the capacitance value of the capacitor 3, while the resonance sharpness Q is determined by the resistance value R of the resistor 4 assuming that the inductance L and the capacitance C are fixedly determined. The resonance frequency $f_{r1}$ is set at a frequency $f_o$ corresponding to the white clip point at which the reproduced level is lowered. The signal read out from the magnetic tape 1 by the magnetic head 2 is applied to the input of the second resonance circuit 6 which is implemented in a manner similar to the first resonance circuit shown in FIG. 2 except that a discrete coil is inserted in place of the pick-up coil 15 of the magnetic head 2. It should however be noted that in the case of the illustrated embodiment, the resonance frequency $f_{r2}$ of the second resonance circuit 6 is selected to be lower than the resonance frequency $f_{r1}$ of the first resonance circuit and is set at a frequency value substantially corresponding to an average level of the picture signal, while the resonance sharpnesses Q of the first and second resonance circuits are so selected that the combined amplitude characteristic of the first and the second resonance circuits becomes substantially flat between the resonance frequencies $f_{r1}$ and $f_{r2}$. In FIG. 4, the combined amplitude characteristic of the first and second resonance circuits is represented by a curve C with a combined phase characteristic of both circuits being represented by a curve D. FIG. 5 shows a spectral diagram of a reproduced picture signal and noise components on the assumption that a carrier frequency corresponding to the white clip point is present. In FIG. 5, P denotes the carrier signal and N denotes noise components. As will be apparent from FIGS. 4 and 5, the second resonance circuit additionally provided in accordance with this invention is effective not only to increase the reproduced signal level but also to decrease relatively the noise level, thereby to assure a significant improvement of the SN ratio in the vicinity of the white clip point of the reproduced picture signal, as compared with the results attained solely by the first resonance circuit. Further, any increasing in the noise level in flat portions or regions is suppressed to a minimum with the SN ratio being little degraded. Further, since the phase characteristic is substantially linear between the frequencies $f_{r1}$ and $f_{r2}$, as can be seen from FIG. 4, distortion of the signal waveform can be improved to a noticeable degree. The output signal from the second resonance circuit 6 is demodulated by the FM demodulator 8 after amplitude variations in the reproduced signal have been eliminated by the limiter circuit 7. Subsequently, after unwanted high frequency components of the demodulated signal have been removed by the low-pass filter 9, the pre-emphasis as imparted in the recording operation is compensated by the de-emphasis circuit 10. The thus reproduced picture signal is provided at the output terminal 11.

In the foregoing, description has been made on the assumption that the resonance frequency $f_{r1}$ of the first resonance circuit of the magnetic head is set in the vicinity of the frequency $f_o$ corresponding to the white clip point. However, in the case where the reproduced level at which the noise of the reproducing amplifier can be neglected, the resonance frequency $f_{r2}$ of the second resonance circuit may be set in the vicinity of the frequency $f_o$ corresponding to the white clip point with the frequency $f_{r1}$ being selected lower than $f_{r2}$. Further, a single resonance circuit exhibiting two kinds of resonance frequencies may be equally employed instead of making use of the resonance circuit of the magnetic head.

As will be appreciated from the foregoing description, the present invention brings about numerous advantages. First, the reproduced signal is insensitive to the influence of the noise produced by the reproducing amplifier itself because of the increase in the level of the reproduced carrier in the vicinity of the white peak. Additionally, because the noise as reproduced is reduced relatively as a whole, the SN ratio is significantly improved in the vicinity of the white peak of the reproduced picture signal. Besides, even when the instantaneous carrier frequency lies in the vicinity of the white peak, the inversion phenomenon described hereinbefore is unlikely to occur, since the low-side band signal and noise component are not emphasized. Finally, by virtue of the improved linearity of the phase characteristic, distortions of the waveform ascribable to asymmetry of the phase characteristic can be eliminated.

What is claimed is:

1. A picture signal amplifying circuit for a magnetic picture signal recording and reproducing apparatus in which a carrier signal is frequency-modulated in dependence on a picture signal after a high frequency band of the picture signal is emphasized in a pre-emphasis circuit and then recorded on a recording medium for being reproduced, said amplifying circuit comprising a first resonance circuit having a first resonance frequency in the vicinity of the frequency of the frequency-modulated carrier signal corresponding to a white peak level of said picture signal which has been emphasized by said pre-emphasis circuit, and a second resonance circuit connected in cascade to said first resonance circuit and having a second resonance frequency in the vicinity of the frequency of said carrier signal corresponding to an average level of said picture signal, wherein a combined frequency-amplitude characteristic of said first and second resonance circuits is so set as to be substantially flat in a frequency band between said first resonance frequency and said second resonance frequency.

2. A picture signal amplifying circuit according to claim 1, wherein said first resonance circuit is composed of the inductance of a magnetic head of said picture signal recording and reproducing apparatus and a capacitor connected in parallel with said magnetic head.

* * * * *